(12) United States Patent
Peev et al.

(10) Patent No.: US 9,881,399 B2
(45) Date of Patent: Jan. 30, 2018

(54) CUSTOM MAP CONFIGURATION

(71) Applicant: Microsoft Technology Licensing, LLC, Redmond, WA (US)

(72) Inventors: Igor Borisov Peev, Arlington, WA (US); Lewey Alec Geselowitz, Redmond, WA (US); James Thomas Marshall, Redmond, WA (US); John A. Payne, Seattle, WA (US); Jagan Subhas, Renton, WA (US); Puneet Bhatia, Redmond, WA (US); Daniel Benjamin Witriol, Kirkland, WA (US); Safiya Bhojawala, Seattle, WA (US); Ehab Sobhy, Redmond, WA (US)

(73) Assignee: MICROSOFT TECHNOLOGY LICENSING, LLC., Redmond, WA (US)

(*) Notice: Subject to any disclaimer, the term of this patent is extended or adjusted under 35 U.S.C. 154(b) by 0 days.

(21) Appl. No.: 14/687,807

(22) Filed: Apr. 15, 2015

(65) Prior Publication Data

US 2016/0307343 A1 Oct. 20, 2016

(51) Int. Cl.
*G06T 11/20* (2006.01)

(52) U.S. Cl.
CPC .................. *G06T 11/206* (2013.01)

(58) Field of Classification Search
CPC .................................................... G06T 11/206

(Continued)

(56) References Cited

U.S. PATENT DOCUMENTS

| 6,836,270 | B2 | 12/2004 | Du |
| 7,912,288 | B2 * | 3/2011 | Winn ............... G06K 9/342 |
| | | | 382/173 |

(Continued)

FOREIGN PATENT DOCUMENTS

| WO | 2013078479 A1 | 5/2013 |
| WO | 2014025948 A1 | 2/2014 |
| WO | 2014130044 A1 | 8/2014 |

OTHER PUBLICATIONS

Verdon, Charles, "Custom Map with Power Map for Excel", Published on: Dec. 19, 2014 Available at: http://blogs.technet.com/b/cansql/archive/2014/12/19/custom-map-with-power-map-for-excel.aspx.

(Continued)

*Primary Examiner* — Javid A Amini
(74) *Attorney, Agent, or Firm* — Merchant & Gould

(57) ABSTRACT

Systems and methods are provided to improve map type data visualizations in which custom images are used as background against which datasets are visualized. In various examples, coordinate systems are automatically generated and applied to the custom image based on the positional data of the dataset. The custom image may replace a pre-existing background, and the plotting of the dataset may be automatically modified based on differences between the pre-existing background and the custom image. Aspects provide for enhanced user control of the map type visualization to further modify how datasets are plotted and how visualizations are presented. Example modifications include offsets and scales, which may be automatically determined and applied or set manually. In some examples, the custom image may be part of a set of image tiles, which are operable to provide various levels of detail from several viewing angles and heights.

20 Claims, 12 Drawing Sheets

(58) Field of Classification Search
USPC .......................................................... 345/440
See application file for complete search history.

(56) References Cited

U.S. PATENT DOCUMENTS

| | | | |
|---|---|---|---|
| 2008/0079723 | A1 | 4/2008 | Hanson et al. |
| 2008/0270946 | A1* | 10/2008 | Risch ................ G06F 17/30716 715/848 |
| 2009/0217147 | A1* | 8/2009 | Thomsen .......... G06F 17/30536 715/214 |
| 2010/0318512 | A1* | 12/2010 | Ludwig ............. G06F 17/30241 707/722 |
| 2011/0044533 | A1* | 2/2011 | Cobb ................. G06K 9/00771 382/155 |
| 2011/0169819 | A1* | 7/2011 | Ian .......................... G06F 3/023 345/419 |
| 2012/0066649 | A1* | 3/2012 | Rashed ................... G06F 19/26 715/854 |
| 2012/0191704 | A1* | 7/2012 | Jones ................... G06F 3/0484 707/722 |
| 2012/0218254 | A1 | 8/2012 | Abeln |
| 2013/0031142 | A1* | 1/2013 | Wester ................. G06F 11/323 707/802 |
| 2013/0188887 | A1* | 7/2013 | Chan ........................ G06K 9/20 382/312 |
| 2014/0307066 | A1* | 10/2014 | Zhu .................... H04N 13/0007 348/51 |
| 2016/0012627 | A1* | 1/2016 | Kishikawa .............. G06T 11/60 345/419 |
| 2016/0065864 | A1* | 3/2016 | Guissin ................... G06T 5/008 348/239 |
| 2016/0275692 | A1* | 9/2016 | Raburn ..................... G06T 7/11 |

OTHER PUBLICATIONS

"3D Analyst and ArcScene", Retrieved on: Jan. 29, 2015 Available at: http://help.arcgis.com/en/arcgisdesktop/10.0/help/index.html#//00q8000000p0000000.

Woodson, Jennifer, "Voxler® 3", Published on: Feb. 2, 2015 Available at: http://www.goldensoftware.com/products/voxler.

"Get Started with Power Map", Retrieved on: Jan. 29, 2015 https://support.office.com/en-us/article/Get-started-with-Power-Map-88a28df6-8258-40aa-b5cc-577873fb0f4a?ui=en-US&rs=en-US&ad=US#_exploring_sample_datasets.

"Amira 3D Software for Life Sciences", Published on: Dec. 16, 2014 Available at: http://www.fei.com/software/amira-3d-for-life-sciences/.

Esposito, Pat, "First Look: Microsoft Power BI", Published on: May 29, 2014 Available at: http://redmondmag.com/articles/2014/06/01/first-look-microsoft-power-bi.aspx.

"Basketball Geek", Retrieved on: Feb. 9, 2015 Available at: http://www.basketballgeek.com/data/.

* cited by examiner

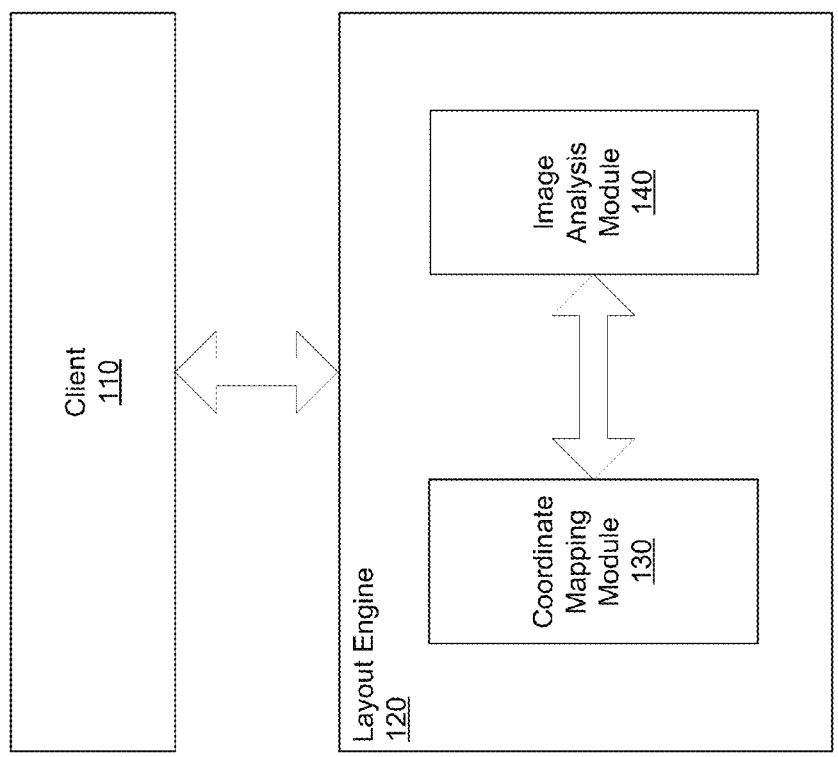

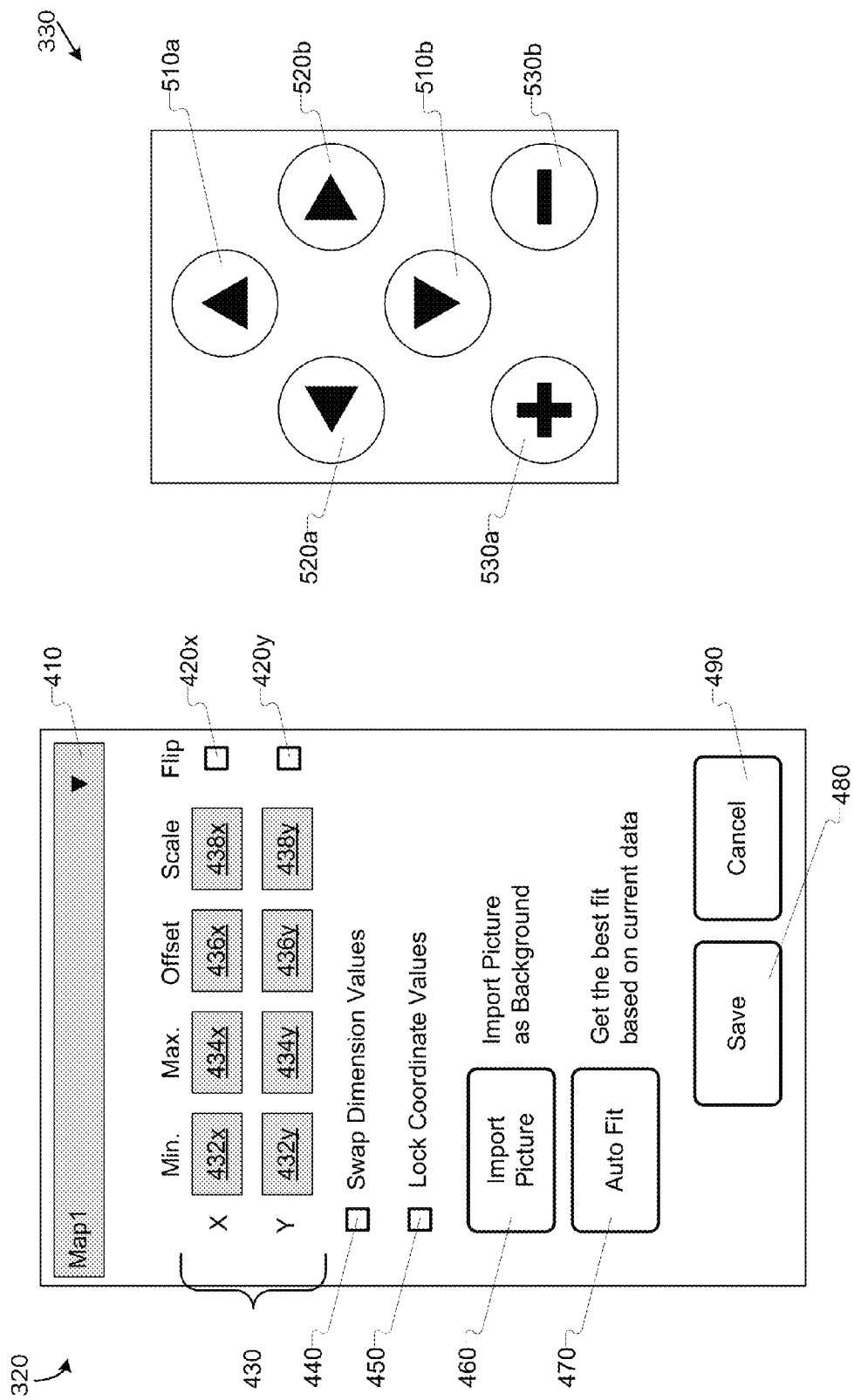

CUSTOM MAP CONFIGURATION

BACKGROUND

Data visualization is a process for graphically representing data in a visualization, for example, a chart, an infographic, a map, a gauge, etc. When visualizing data series in a map type visualization, a background provides context for viewing the graphical representations of the data series. However, the data series must include properly formatted positional data to be displayed in the correct locations relative to features depicted on the background. Prior data visualization systems and methods forced users to conform data to pre-existing backgrounds to provide proper correlation between the data series and the background. Translating data from one mapping visualization to another and using custom backgrounds in these systems was difficult and resource intensive.

SUMMARY

This summary is provided to introduce a selection of concepts in a simplified form that are further described below in the Detailed Description section. This summary is not intended to identify all features of the claimed subject matter, nor is it intended as limiting the scope of the claimed subject matter.

Systems and methods for improving the functionality of a data visualization system by enabling custom map configurations are provided. Data may be graphically represented in a visualization via several methods. One such method is via a map type visualization, in which the data series of a dataset are graphically represented against a correlated background. For example, the health department scores for restaurants in a town are graphically represented as columns having heights that represent the health scores against a background of a map of the town, where each column is placed over the map where the associated restaurant would be located on the map.

As will be understood, to graphically represent a dataset against a background, the data series are associated with positional data and the background is associated with a coordinate system. The positional data and coordinate system may come in a variety of forms (e.g., Cartesian, polar, latitude and longitude, etc.), but for a map type visualization to be properly created, the data series and the background have correlating coordinate types and scales. For example, a data series with polar positional data (e.g., r and θ coordinates) would be mapped incorrectly against a background having a Cartesian coordinate system (e.g., x and y coordinates). Similarly, a data series having Cartesian positional data scaled to feet (e.g., x=2 equates to two feet from the origin) would be mapped incorrectly against a background having Cartesian coordinates scaled to miles (e.g., x=2 equates to two miles from the origin). Additionally, the positional data and the coordinate system have the same origin so that the graphical representations of the data series will be properly positioned. As will also be understood, data series and maps can come in a variety of coordinate types and scales, for which the custom configuration is provided for herein.

Several example systems and methods are described herein, which enable the configuration of custom maps. According to aspects, a custom map includes a modifiable background, which may include a pre-existing map background, a custom image designated as a background, or a blank canvas. According to aspects, coordinate systems are automatically generated and associated with custom images based on the positional data of the dataset, which a user may further modify. The custom image may replace a pre-existing background, and how the dataset is plotted may be automatically modified based on differences between the pre-existing background and the custom image.

Aspects provide for enhanced user control of the map type visualization to further modify how datasets are plotted and how visualizations are presented. Example modifications include offsets and scales, which may be automatically determined and applied or set manually. For example, the association between the data series and the background may be temporarily disconnected so that a user may rotate, tilt, zoom, and pan an element independently of the rest of the visualization. When the association is reconnected, the coordinate system of the background may be regenerated to match the visualized positions of the graphical representations of the data series. In this way, new datasets may be added to the visualization, or the background reused with a new dataset, such that the positional data will properly correlate to the background in the map type visualization without the need to translate or alter the underlying positional data.

Aspects provide for the interpretation of a dataset for use in a custom map type visualization while preserving the underlying data to improve the efficiency of the system providing the visualization (or the dataset) by reducing the amount of data required to produce multiple visualizations. For example, different scales and offsets may be applied to the same underlying dataset for use against two different backgrounds without altering the dataset; preserving it for later use without requiring an additional copy.

Aspects provide for the more efficient association of datasets to arbitrary backgrounds within a visualization by enabling automatic fitting of the dataset to the image and additional tools for users to both textually and visually modify a visualization or individual elements of the visualization to match a dataset to an arbitrary background. Users are thereby provided an improved user experience.

Examples may be implemented as a computer process, a computing system, or as an article of manufacture such as a computer program product or computer readable media. The computer program product may be a computer storage medium readable by a computer system and encoding a computer program of instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of other aspects of the present disclosure.

BRIEF DESCRIPTION OF THE DRAWINGS

The accompanying drawings, which are incorporated in and constitute a part of this disclosure, illustrate various examples and aspects of the present disclosure. In the drawings:

FIG. 1 is a block diagram of an example system operable to provide improved functionality to a data visualization system;

FIG. 4 illustrates an example user interface (UI) for modifying values used for the presentation of a map type visualization;

FIG. 5 illustrates an example UI for visually modifying the presentation of a map type visualization;

DETAILED DESCRIPTION

Figure 2A:
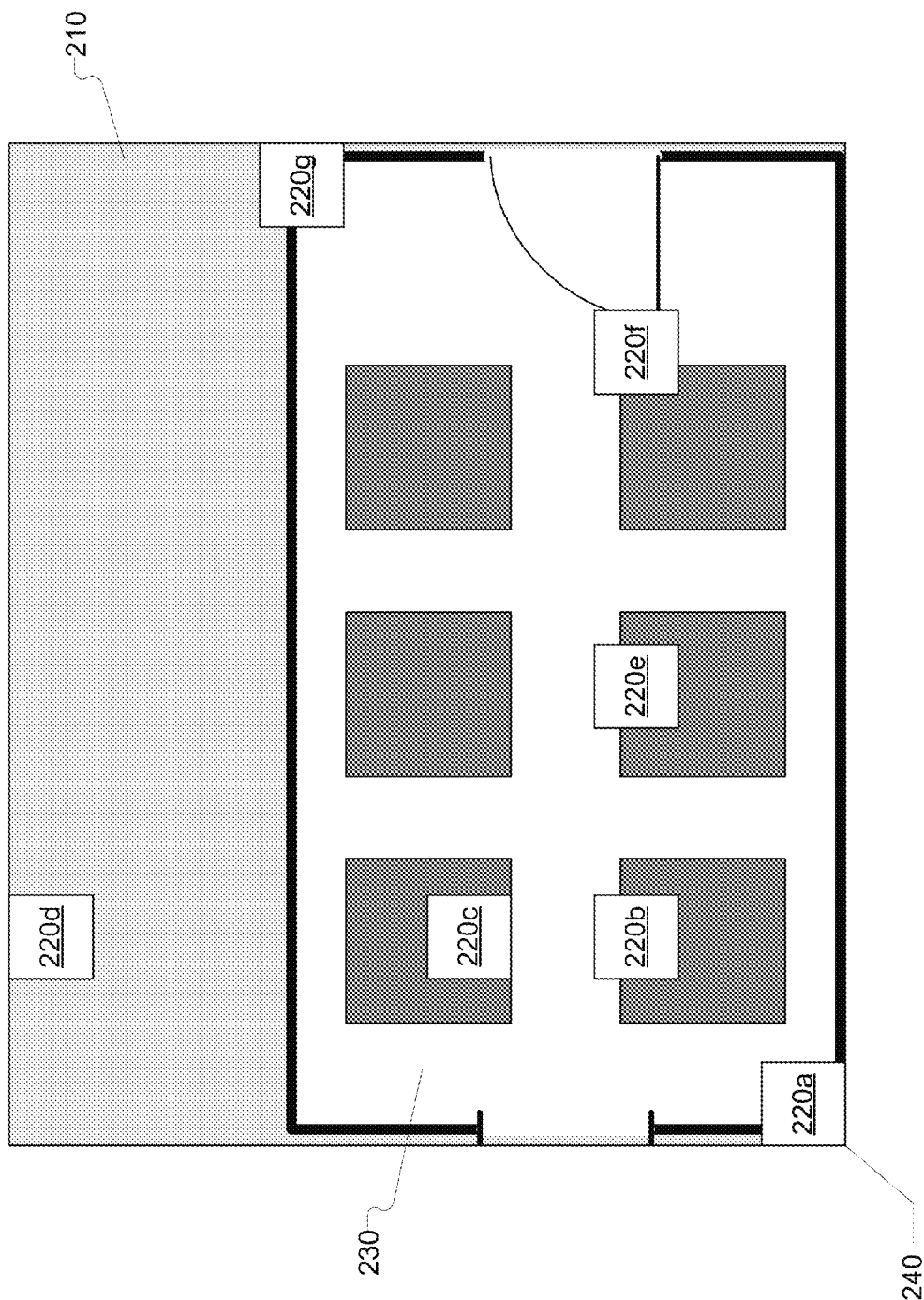
FIGS. 2A-D illustrate example visualizations of the same dataset in various states as it is plotted in a map type visualization against a custom background.

The following detailed description refers to the accompanying drawings. Wherever possible, the same reference numbers are used in the drawings and the following description to refer to the same or similar elements. While aspects and examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is described by the appended claims. Examples may take the form of a hardware implementation, or an entirely software implementation, or an implementation combining software and hardware aspects. The following detailed description is, therefore, not to be taken in a limiting sense.

Systems and methods for improving the functionality of a data visualization system by enabling custom map configurations are provided. Data may be graphically represented in a visualization via several methods. One such method is via a map type visualization, in which the data series of a dataset are graphically represented against a correlating background operable to provide additional insights regarding the data.

As will be understood, to graphically represent a dataset against a background, the data series is associated with positional data, and the background is associated with a coordinate system. The positional data and coordinate system may come in a variety of forms (e.g., Cartesian, polar, latitude and longitude, etc.), but for a map type visualization to be properly created, the data series and the background have correlating coordinate types, scales, and origins. As will also be understood, data series and maps come in a variety of coordinate types and scales, for which the custom configuration is provided for herein.

According to aspects, a custom map includes a modifiable background, which may include a pre-existing map background, an image designated as a background, or a blank canvas that is operable to have its coordinate system modified. According to aspects, coordinate systems are automatically generated for and associated with arbitrary backgrounds based on the positional data of the dataset, which a user may further modify. Aspects provide for the association between the data series and the background to be temporarily disconnected so that a user may modify, rotate, tilt, zoom, and pan the selected background or dataset independently of the rest of the visualization. When the association is reconnected, the coordinate system of the background is regenerated to match the visualized positions of the graphical representations of the data series. In this way, new data series may be added to the dataset, or the background reused with a new dataset, such that the positional data will properly correlate to the background in the map type visualization without the need to translate or alter the underlying positional data.

Aspects provide for the interpretation of a dataset for use in a custom map type visualization while preserving the underlying data to improve the efficiency of the system providing the visualization (or the dataset) by reducing the amount of data required to produce multiple visualizations. For example, different scales and offsets can be applied to the same underlying dataset for use against two different backgrounds without altering the dataset; preserving it for later use without requiring an additional copy.

Aspects provide for the more efficient association of datasets to arbitrary backgrounds within a visualization by enabling automatic fitting of the dataset to the image and additional tools for users to both textually and visually modify a visualization or individual elements of the visualization to match a dataset to an arbitrary background. Users are thereby provided with an improved user experience.

FIG. 1 is a block diagram of an example system 100 operable to provide improved functionality to a data visualization system. As illustrated, the system 100 comprises a client 110, operable to provide a visualization, and a layout engine 120, operable to enable the use of custom images within a visualization and assemble map type visualizations. According to the illustrated aspect, the layout engine 120 includes a coordinate mapping module 130, operable to create and associate a coordinate system with a custom image, and an image analysis module 140, operable to interpret a custom image to position a dataset against key features in a map type visualization.

According to aspects, the client 110 is operable to provide visualizations of data according to several types or solely according to combinations related to map type visualization. In several aspects, the client 110 provides user interfaces (UI) to interact with the visualization, to select datasets to display in the visualization, and select images for use in the visualizations. In various aspects, the datasets and images may be hosted locally by the client 110 (e.g., a data table in a spreadsheet client 110), imported by the client 110, or linked to by the client 110. According to various aspects, the client 110 may be a component of another application, for example, a database software application, such ACCESS®, a spreadsheet software application, such as EXCEL®, or a search engine, such as BING®, all offered by MICROSOFT CORPORATION of Redmond, Wash., and may be hosted locally or remotely from a user as part of an integrated or distributed computing system.

According to aspects, the client 110 is operable to provide the visualization. In one example, the client renders the visualization by passing the visualization, via an appropriate Application Programming Interface (API), to an output device (e.g., monitor, projector, television, printer, etc.). In another aspect, the client 110 caches the visualization for repeated actions, such as, for example, applying animations, providing interactivity between the visualization and the represented data, and allowing navigation of the visualization (e.g., panning, zooming, rotating, etc.).

According to aspects, the client 110 is operable to provide instructions to the layout engine 120 when the visualization is created, updated, or an action is performed. The instructions, in various aspects, include system processes and user input. According to examples, instructions include the data to be graphically represented, images for use as custom backgrounds, a definition of the visualization type in which the data will be represented, and settings to modify the data, the visualization, or the system 100.

The layout engine 120 is operable to receive datasets, images, and instructions from the client to create custom map type visualizations for the client 110. When creating a custom map type visualization, aspects of the layout engine 120 are operable to create geometry to represent the datasets within the visualization, position the geometry against a background, and adjust the geometry and positioning based on further instructions or updates to the datasets or image from the client 110.

According to aspects, the layout engine 120 is operable to create a scene from a visualization. According to aspects, scenes may be assembled into tours, wherein each scene presents a view from a visualization. As will be understood, tours can include scenes representing various datasets plotted against various background images according to various visualization settings (e.g., viewing angle, zoom percent, visualization type, visual theme, etc.). In one example tour of global product sales, a scene of a map type visualization of global sales is assembled along with scenes of map type visualizations of country-specific sales. In the example, each scene may use a separate image as a background (e.g., the world, and each country) or, when the image for the global scene has sufficient detail, each scene may use different views of the same image. Also in the example, each scene may use different datasets or the same dataset.

The graphical representations of the datasets may be created differently for each scene, even when using the same datasets. For example, datasets may be amalgamated when a map type visualization is zoomed out so that the sales data may be illustrated as country-by-country sales data in the global scene, but presented as state/province sales data in a country-specific scene. For example, each state may have a column representing the sales of product in that state, but when zoomed out, the data used to create the individual states' columns are added together for a column to represent the sales in the country. As will be understood, aspects provide for different scaling factors and offsets for the columns in the zoomed in and zoomed out scenes.

In one aspect, the layout engine 120 is operable to create visualizations of scenes with layered datasets, wherein two or more datasets or sub-sets/categories of a dataset are displayed simultaneously in the same visualization or scene. Layering techniques include, but are not limited to: stacking one dataset on another (e.g., stacked columns), clustering datasets, using different colors/shapes/patterns to distinguish the datasets, animating a fade in/out of datasets, an override criteria (e.g., max, min, most recent, etc.) and combinations thereof.

The layout engine 120, when creating a map type visualization, is operable to use pre-existing images as backgrounds, against which datasets are plotted, and to use custom images as backgrounds. According to aspects, the pixel space of a custom image is associated with a coordinate system so that the positional values of a dataset can be aligned within the coordinate system when the image is used as a background. According to aspects, custom backgrounds can be cached for reuse in an additional visualization and in multiple scenes. For example, a first visualization uses an image of a restaurant to illustrate the average length of stay of patrons at each table and a second visualization can use the same image to display the average bill for patrons at each table in that restaurant.

According to aspects, the layout engine 120 includes a coordinate mapping module 130 operable to mesh a custom image with a coordinate system to map datasets against in a map type visualization. A custom image may be any image specified by a user for use as a background in a map type visualization. As will be understood, not all images specified by a user will initially include a coordinate system usable in combination with the positional data of a dataset.

According to aspects, the coordinate mapping module 130 is operable to process the dataset (or datasets) to calculate a coordinate system for the custom image and scale the dataset's positional values to the coordinate system. According to aspects, the bounds of the dataset (e.g., the minimum and maximum values for each dimension in the dataset) are used to calculate a relationship to the pixels of the image. Accordingly, when the background is increased (or decreased) in size, the coordinate mapping module 130 is operable to adjust the coordinate system to correspond to the new pixel-size of the background. For example, when creating a coordinate system for a 100×100 pixel image for a dataset with a minimum x-value of 150 units and a maximum x-value of 250 units, the coordinate mapping module 130 creates a coordinate system in which each pixel has a coordinate value of 2.5 units in the x dimension, so that the origin and maximum values will be plotted at the edge of the image and the other data series will be distributed in the image according to this pixel-scale. In an alternative example, because the range of the bounds in the above example is 100, the coordinate mapping module 130 is operable to create a coordinate system with a different pixel-scale, in which each pixel has a coordinate value of 1 unit in the x dimension and the origin of the coordinate system lies 150 "pixels" outside of the image, so that the maximum and minimum values are plotted to the edges of the image.

According to aspects when data exists in a plot area before a custom image is imported, the coordinate mapping module 130 is operable to scale the custom image to best fit the pre-existing coordinate system. For example, when an image is removed from the plot area and a custom image is imported having a different pixel size (e.g., 100×150 pixels versus 100×100 pixels originally), the coordinate mapping module 130 may apply a best fit. In one example, the new image expands the size of the plot area to accommodate the extra 100×50 pixels of the new image and the pre-existing coordinate system is retained, such that no data points will initially appear in the expanded portion of the new image. In another example, the new image is scaled to fit in the pre-existing plot area (e.g., the 100×150 pixel image is scaled by 0.67 to fit in a 100×100 pixel plot area to 67×100 pixels), such that some "blank" plot area not corresponding to the new image exists in which data points may initially appear. In another example, the new image may be scaled to match the pre-existing data regardless of the pre-existing plot area and coordinate system.

According to various aspects, the coordinate mapping module 130 is in communication with an image analysis module 140 to determine how to best fit a dataset to a new or replacement custom image.

According to aspects, the layout engine 120 includes an image analysis module 140, operable to interpret a custom image for use as a background. The image analysis module 140 uses the dataset and, in some aspects, a definition of the visualization type to determine key features in an image to determine the context in which to plot the dataset against the background.

The image analysis module 140 is operable to build a context from the key features, which is used to determine whether the dataset is displayed properly against the background. For example, a key feature may be a graphical representation of a country, city, road, building, tables, region, etc., that the image analysis module 140 determines that a portion of the dataset should be plotted against in the visualization. In various examples, the image analysis module 140 is operable to parse text, detect borders of potential objects/regions, detect changes in color, and compare an arbitrary custom image against known images to determine key features (e.g., via borders, landmarks, image tags, etc.).

From the key features and context, aspects of the image analysis module 140 are operable to apply offsets and scales to the positional values of the dataset to adjust the coordinate system or align the dataset with the background to match the context. For example, when zooming into a tiled visualization, (e.g., where different zoom levels and viewing angles use different image "tiles" of different details for the same key features), the image analysis module is operable to move individual data series' graphical representations to appear over the same key features (e.g., a building on a map) at different resolutions/angles. In various examples, the image analysis module 140 is operable to link the contexts of two or more images, such that a key feature of one image corresponds to a key feature in a second.

When a pre-existing background is replaced, such as when a custom image is applied by a user or a new tile from a set of tiles is specified due to a change in viewing angle/zoom level, the image analysis module 140 is operable to associate the key features of the new background with corresponding key features in the pre-existing background. In some aspects, differences in distance in a given dimension between the key features in the new background and distance between the associated key features in the previous background are used to determine a scale to apply to the dataset to modify how it is plotted against the new background in the given dimension. Similarly, examples of the image analysis module 140 are be operable to determine offsets to apply to the dataset in a given dimension to modify how it is plotted against the new background based on an analysis of the differences in size between the new and previous backgrounds and changes in distance between the key features and the edge of the backgrounds in the given dimension between the new and previous backgrounds.

In aspects using image tiles, the image analysis module 140 is further operable to enable the use of custom image tiles. A set of image tiles provides a plurality of views in a map type visualization related to different levels of detail (e.g. "zoom level") and different viewing angles. In various examples, custom image tiles replace existing tiles in a set (e.g., to provide newer images) or provide additional views (e.g., additional zoom levels, more viewing angles).

When the background comprised of a set of image tiles is changed via a panning, zooming, or rotating action, at least some of the image tiles used to comprise the background are replaced with new image tiles from the set to provide a different view. For example, when panning left, the right-most image tiles may be removed, the remaining image tiles shifted right, and new tiles inserted. In another example, new tiles with enhanced/decreased detail are provided as a user zooms in and out of a visualization. In yet another example, when a user rotates a visualization, or tilts the visualization in three-dimensional space, different image tiles from the set are provided that are appropriate for the new viewing angle. According to aspects, the image analysis module 140 is operable to provide associations between key features shown in the several image tiles that comprise a set of image tiles so that the new tiles may be provided from the set in the proper position relative to the previous tiles and so that how the dataset is plotted against the new tile is modified to still provide proper correlation.

FIGS. 2A-D illustrate example visualizations of the same dataset in various states as it is plotted in a map type visualization against a custom background. As will be understood, although examples are given herein primarily according to Cartesian positional data and coordinate systems, the systems and methods described herein are operable to use other positional data and coordinate systems (e.g., polar, latitude/longitude, etc.). As will also be understood, the origin 240 illustrated in FIGS. 2A-D is set in the lower left corner of the plot area 210, but may be set at any position in the plot area 210 or set outside of the plot area 210 (e.g., a map visualization for North America using latitude/longitude may omit the intersection of the equator and prime meridian from the plot area 210 in various examples).

FIG. 2A illustrates an initial plotting of a dataset in a map type visualization. As illustrated, the dataset is plotted within a plot area 210, wherein each data series 220*a-g* (collectively, data series 220) is plotted according to its positional values. To provide additional insight for the data series 220, the data series 220 are plotted against a background image 230, which as illustrated depicts a room and furnishings.

According to aspects, the data series 220 are processed to determine the minimum and maximum positional values within the dataset, which are set as the boundaries of the plot area 210 when initially importing the dataset into the plot area 210. As should be understood, the terms "maximum" and "minimum" are used in relation to an origin 240 and the systems and methods described herein are free to invert maxima and minima for any positional data. As is illustrated in FIG. 2A, data series 220*a* includes the minima for the horizontal and vertical positional values, data series 220*d* includes the maximum vertical positional value, and data series 220*g* includes the maximum horizontal positional value. Although each maximum and minimum is illustrated as included in a single data series 220, multiple data series 220 can share a maximum or minimum positional value. For example, if the dataset did not include data series 220*a*, data series 220*b*, 220*e*, and 220*f* would all include the minimum vertical positional value.

According to an aspect, the data series 220 that include the maximum and minimum positional values are plotted at the edge of the plot area 210. According to another aspect, only one dimension's maximum or minimum value is used to plot data series 220 to an edge of the plot area 210. For example, for a polar coordinate system having an origin 240 at the center of the plot area 210, the data series 220 having the maximum radius value (r) would be plotted to an edge of the plot area 210, whereas the data series 220 with the maximum or minimum values for angle (θ) would not impact the positioning of data series 220 on an edge of the plot area 210. In another example, where a dataset is to be plotted against a fixed-size plot area 210 via a Cartesian coordinate system, one dimension's (e.g., horizontal or vertical) maximums and minimums are plotted to the edges of the plot area 210, and the scaling factor used to plot the first dimension to the edges is used again for the second dimension. As will be understood, using a shared scaling factor may result in at least one of the maximum and minimum values of the second dimension not corresponding with the edge of the plot area 210.

According to aspects, the background image 230 is imported into the plot area 210 and evenly scaled to best fit the available plot area 210. According to aspects, when evenly scaling the background image, each dimension of the background image 230 is increased (or decreased) in size according to the same scale. For example, a 10×10 pixel image is evenly scaled by a scale of 10 to 100×100 when used as a background image 230. According to aspects, when evenly scaling, where the background image 230 is imported into a pre-existing plot area 210 having a different aspect ratio, portions of the plot area 210 may not correspond to the background image 230. For example, as is illustrated in FIG. 2A, a background image 230 with an aspect ratio of 3:2 can be evenly scaled within a plot area 210 having a 4:3 aspect ratio, but some of the plot area 210 will not correspond with the background image 230 and will be "blank." According to other aspects, different scales can be used for the background image 230 to unevenly scale it. According to still other aspects, the background image 230 defines the plot area 210, such that the size of the plot area 210 is adjusted to directly correlate to the background image 230.

Figure 2B:
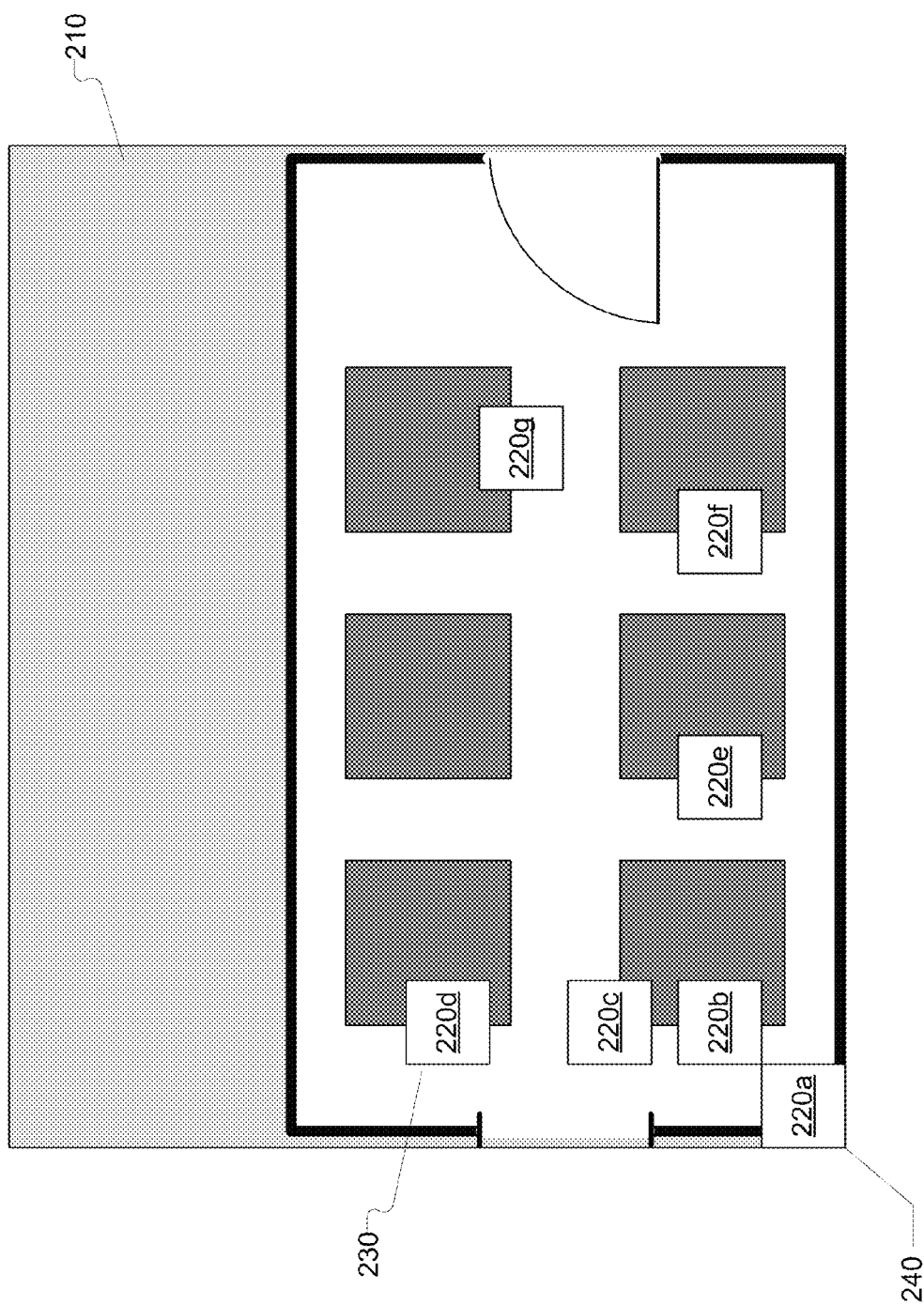

FIG. 2B illustrates a rescaled background image 230 and rescaled data series 220 from those illustrated in FIG. 2A. Although the visualization system will present the data series 220 and the background image 230 against one another in a map type visualization, rescaling of either may be necessary to properly convey contextual information (e.g., to conform the data series 220 to key features in the background image 230). As discussed in greater detail in FIGS. 4 and 5, rescaling can be automatic, manual, or a combination thereof. Rescaling allows for the map type visualization to be properly presented with the dataset and corresponding to the background image 230 while preserving the underlying dataset and background image 230.

As is illustrated in FIG. 2B, the background image 230 has been rescaled from that illustrated in FIG. 2A. The background image 230 has been rotated and stretched to fit the plot area 210. According to aspects, the background image 230 is also operable to be rescaled via mirroring (vertically or horizontally), cropping, merging with another background image, tiling, adding blank background to the plot area 210, etc.

As is illustrated in FIG. 2B, the data series 220 have been rescaled from those illustrated in FIG. 2A. Data series 220*d*, which includes the maximum vertical value, is no longer plotted at the edge of the plot area 210, but the data series 220 have been vertically and horizontally moved proportionally closer to the origin 240. The proportional movement of data series 220 in the vertical and horizontal directions, as is illustrated in FIG. 2B, may be done according to different scales (e.g., vertical 3:2 and horizontal 4:3), but according to aspects may be bound to a single scale (e.g., the vertical and horizontal scales are the same). As illustrated, data series 220*a* is set at the origin 240, and therefore does not move, whereas the other data series 220*b-g* each move closer to the origin 240. According to aspects, the data series 220 are also operable to be rescaled via moving proportionally further from the origin, moving proportionally closer to/further from a midpoint, mirroring (vertically or horizontally), cropping (e.g., excluding a data series 220), merging with another dataset, etc.

Figure 2C:
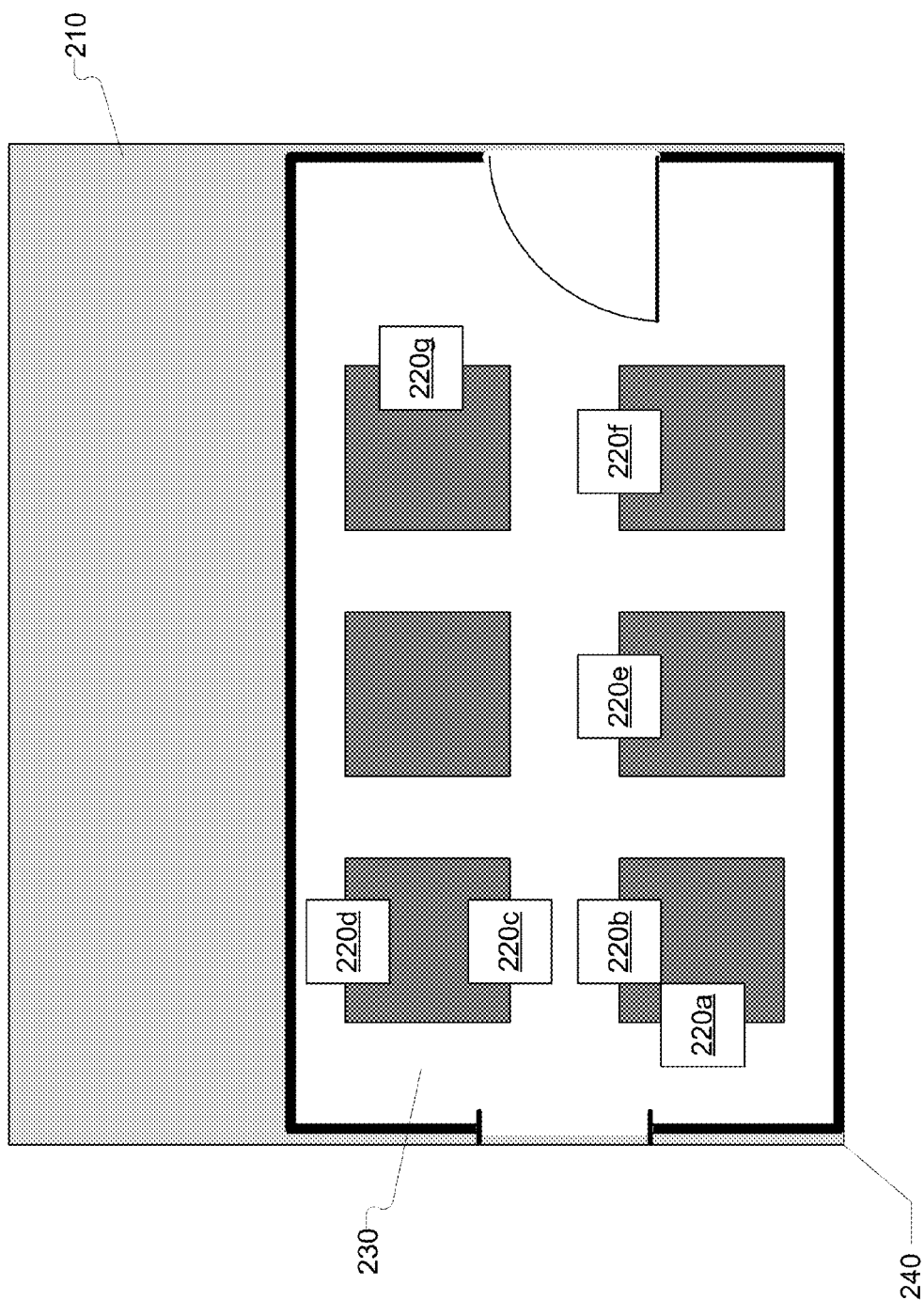

FIG. 2C illustrates offsetting a dataset within a map type visualization from that illustrated in FIG. 2B. Even when properly scaled, a dataset may not be properly positioned against the background image 230 according to a context. According to aspects, an offset is applied to a data series 220 to reposition it relative to an origin 240. According to aspects, one or multiple data series 200 are moved equally closer/further to the origin 240 according to the offset to properly position the data series 220 against the background image 230. According to another aspect, the origin 240 is moved to a new location within the background image 230 according to the offset, and the positional values of the dataset remain unaffected while providing re-positioned data series 220.

Figure 2D:
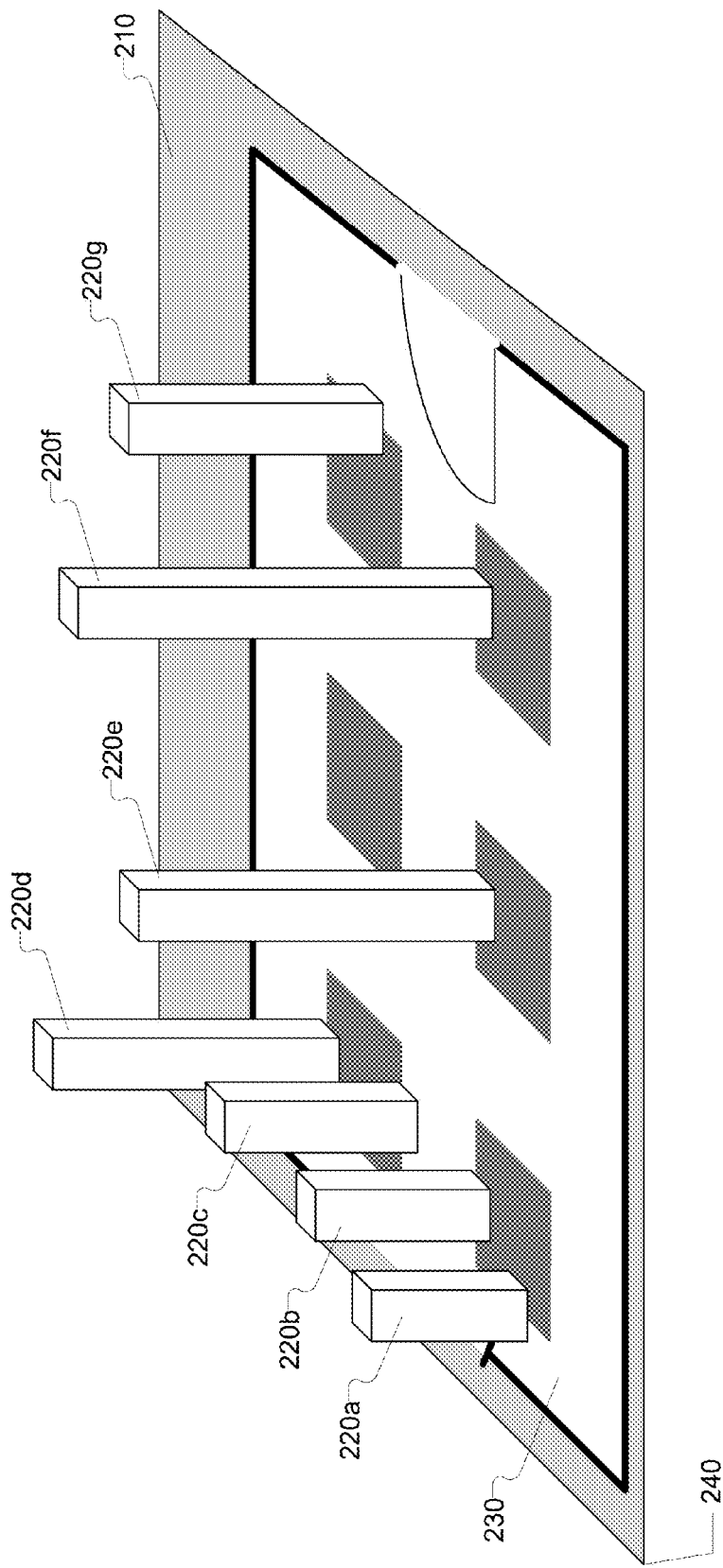

FIG. 2D illustrates a perspective shift of a map type visualization from that illustrated in FIG. 2C. A background image 230 may be imported as a two-dimensional image, but for a data series 220 to convey additional meaning to the background image 230, an additional dimension to represent a data value beyond the positional values is needed. A perspective shift enables the additional dimension (e.g., a z-dimension) to be visualized against the background image 230. Example perspective shifts include isometric, dimetric, and trimetric projections of the data series 220 and the background image 230. According to an aspect, a two-dimensional background image 230 and plot area 210 are redrawn to appear as a base for the now three-dimensional data series 220. According to another aspect, the background image 230 is applied as a pattern to a surface of a three-dimensional object on which the data series 220 are rendered. For example, in FIGS. 2A-C, the viewpoint of the map type visualization can be considered to be either two-dimensional or aligned along the z-axis to provide a "top down perspective." A perspective shift appears to moves the viewpoint, and the background image 230 is redrawn accordingly.

Other additional dimensions include color (e.g., for a heat map) and time (e.g., for illustrating paths via animation), which do not require a perspective shift to convey value, but may benefit from perspective shift to improve the clarity or consistency in conveying information. Several additional dimensions may be combined at one time in various aspects (e.g., time and a z-axis may be combined to show values over a period of time) according to various visualization types.

Figure 3:
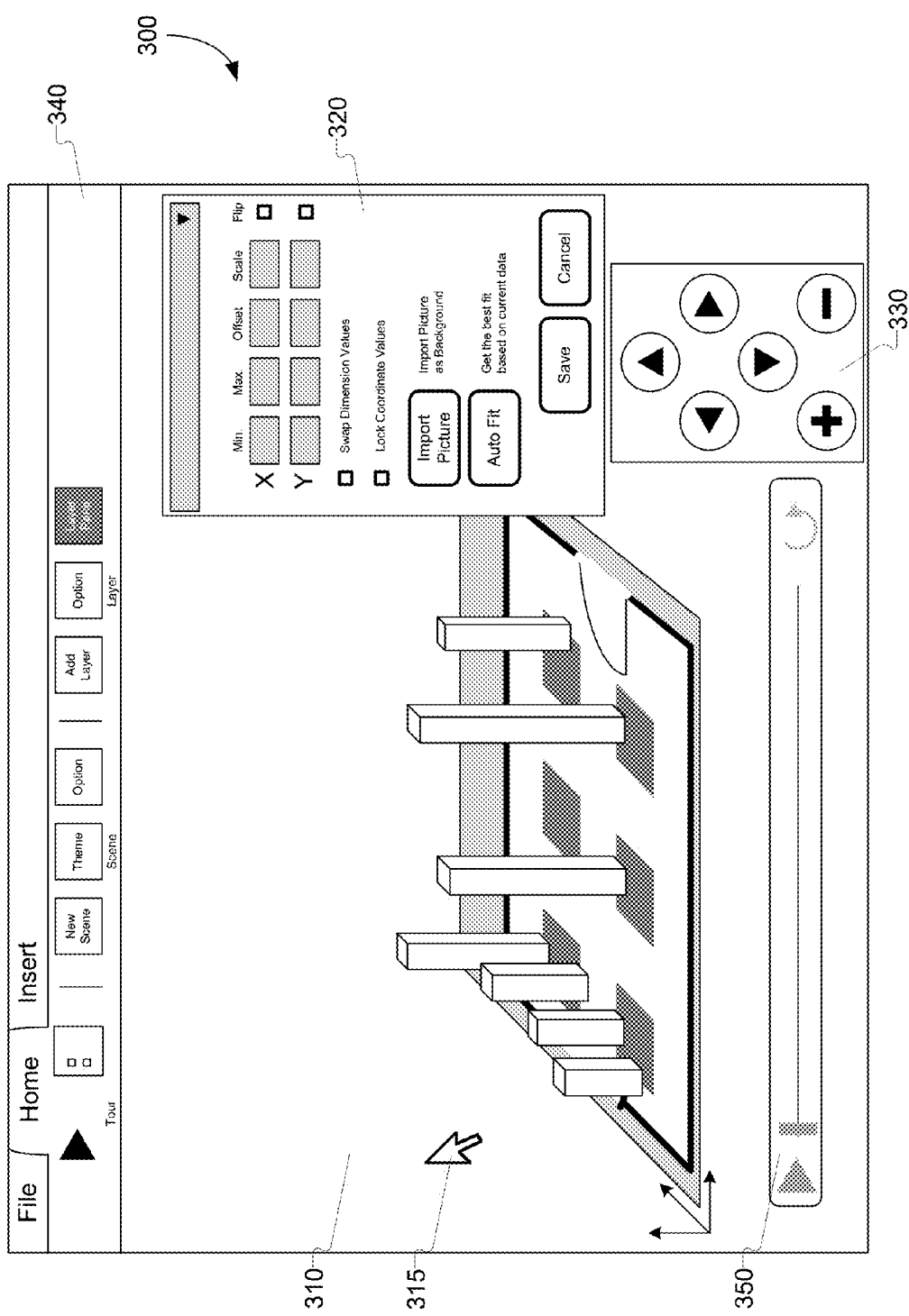
FIG. 3 illustrates an example client application providing a custom map visualization.

FIG. 3 illustrates an example client application 300 providing a custom map visualization. As illustrated, the custom map visualization is provided in a viewing pane 310. According to various aspects of the client application 300, various elements of the client application 300 are operable to modify the custom map visualization and how it is displayed. For example, a user may select a dataset, a data series 220, or the background image 230 to move in the viewing pane 310 (e.g., via drag and drop), such as via a cursor 315. In further examples, a user interface (UI) 320 is provided to modify the values used to present data in the visualization, or a UI 330 is provided to present additional controls to manually modify the visualization. According to aspects, a ribbon interface 340 is provided to present various functions and abilities within the client application 300 (e.g., import a dataset, import an image, apply visual themes, etc.). In examples where time is a dimension, client application 300 may provide a play interface 350, operable to enable a user to see a visualization at a specific point in time and sequentially play back the visualization at each point in time, similar to a video. As will be understood, the features and methods for modifying the visualization or the display thereof provided by one element of the client application 300 may be presented several elements (e.g., both the ribbon interface 340 and UI 320 may provide a function to import an image, both the viewing pane and UI 330 may provide for zooming, etc.).

FIGS. 4 and 5 illustrate example user interfaces (UI) for modifying the presentation of a map type visualization.

These UI are given as non-limiting examples; more or fewer features may be used, and features may be presented via alternative arrangements with alternative themes and styling.

FIG. 4 illustrates an example UI 320 for modifying values used for the presentation of a map type visualization. In different aspects, the UI 320 may be presented within a client application 300 providing a map type visualization as a dialog box (modal or non-modal) or as part of a docked control panel or ribbon interface 340. According to aspects, the UI 320 is operable to affect the background image 230, one dataset at a time, or multiple datasets simultaneously when modifying the values for the presentation of a map type visualization.

According to aspects, UI 320 includes a name box 410 for entering a name for an element of the map type visualization. According to aspects, because the UI 320 is operable to modify the background image 230 and datasets, the name box 410 is operable to show the name of the element being modified (e.g., an actively selected dataset, key feature, or background image 230) or to select an element to modify. According to aspects, name box 410 comprises a drop down list of the names of each of the elements of the map type visualization. As illustrated, "Map1" is the name of the element being modified. According to aspects, names may be set by a user, retrieved from the element (e.g., a filename, chart title, etc.), or automatically generated by the system (e.g., Map1, Background4, Layer2, etc.). The associated settings are operable for reuse within a scene or a tour, therefore, multiple versions of the background image 230 having unique names may be desired, wherein each version is a series of settings (e.g., contexts, coordinate systems, offsets, scales, etc.) associated with the custom image, which may be preserved in its original state.

The UI 320 enables the value manipulation of bounds, scaling factors, and offsets, according to aspects, via input boxes 430. Example input boxes 430 display the current positional values used in the map type visualization and enable those values to be edited. According to aspects, input boxes 430 correspond to the coordinate system, for example, input boxes 430 appropriate for x and y values are provided for a Cartesian coordinate system, as illustrated in FIG. 4, whereas input boxes 430 appropriate for r and θ values are provided for a polar coordinate system. Although example aspects are discussed herein primarily in terms of x and y coordinates/values, one of skill in the art will understand that the current disclosure also enables the use alternative coordinates/values.

According to some aspects, not all of the input boxes 430 are editable at the same time, for example, the minimum x-value box 432$x$, minimum y-value box 432$y$, maximum x-value box 434$x$, and maximum y-value box 434$y$ can be provided for informational purposes as non-editable input boxes 430. According to an aspect, non-editable input boxes 430 are "grayed out" compared to editable input boxes 430 to indicate their non-editable status. In an example, a change to a value in an editable input box 430 will affect the displayed value in a non-editable input box 430, but the value in the non-editable input box 430 cannot be directly edited.

According to aspects, the minimum value boxes 432 and the maximum value boxes 434 are operable to affect the interpretation of positional values from a data series 220 in a given dimension against the coordinate system of a plot area 210. Minimum x-value box 432$x$, minimum y-value box 432$y$, maximum x-value box 434$x$, and maximum y-value box 434$y$ are illustrated examples of minimum value boxes 432 and maximum value boxes 434 for their respective dimensions (e.g., x and y). According to aspects, input via minimum value boxes 432 and maximum value boxes 434 moves the position of the data series 220 including those values within the plot area 210 and automatically adjusts the values of the corresponding scale boxes 438 and offset boxes 436, and vice versa.

Aspects allow for the scale of the positional values of the dataset to be numerically adjusted via scale boxes 438, such as the illustrated x-scale box 438$x$ and y-scale box 438$y$. According to aspects, the scale may be a percentage value, which is multiplied against the positional value in the given dimension of each data series 220 to proportionally adjust the positional data of the dataset, such as is illustrated in relation to FIG. 2B relative to FIG. 2A. According to another aspect, the scale value may be a formula. For example, when the background image 230 is a Mercator projection of the world, where the scale of features changes as distance to the poles changes, a formulaic scale value enables the scale of the data series 220 to vary to correspond with the projection's variable scale.

According to aspects, the offset boxes 436 position the data series 220 relative to an origin 240 for a given dimension (e.g., x via x-offset box 436$x$ or y via y-offset box 436$y$), such as is illustrated in relation to FIG. 2C relative to FIG. 2B. According to some aspects, the offset is a plain value, (e.g., 42), which is added to the position value in the given dimension of each data series 220. According to other aspects, the offset is a percentage (e.g., 20%), which in some aspects is based on a percentage of the range between the minimum and maximum positional values (e.g., maximum-minimum) for a given dimension to produce a plain value to be added to the position value in the given dimension of each data series 220.

According to aspects, flip boxes 420, such as illustrated x-flip box 420$x$ and y-flip box 420$y$, enable the positional values for the corresponding dimension to be flipped. When flipped, the positional value for the given dimension of each dataset is interpreted so that the visualization provides a mirror image of the datasets. According to aspects, the scale and offset for a flipped dimension may remain unchanged, reset (e.g., to 100% or 0), or invert (e.g., a plain value offset of 42 inverts to −42, a percentage offset of 20% inverts to 500%, etc.) when a flip box 420 is activated.

According to an aspect, UI 320 includes dimension-swap box 440 to enable the interpretation of dimensions to be reversed, for example, x-values of a data series 220 are interpreted as y-values (and vice versa) when checked.

According to another aspect, UI 320 includes lock box 450 to prevent the relative movement of a dataset relative to a background image 230. According to an aspect, locking a dataset to the background image associates the graphical representations of the data series 220 to the background image 230, such that moving one (e.g., via a dragging motion) equally moves the other to provide alternative views of the visualization (e.g., zoom levels, viewing angles, etc.). Accordingly, when the dataset is not locked to (e.g., is disassociated from) the background image 230, the dataset and the background image may be moved independently from one another, which allows for data series 220 to be repositioned relative to the background image 230 or the background image 230 to be repositioned relative to the plot area 210 and the data series 220.

According to aspects, dimension-swap box 440 and lock box 450 are operable to apply to an individual data series 220, an individual dataset, or to multiple datasets. According to aspects, each data series 220 is operable to be affected by different modifications, which enables the combination of disparate datasets (e.g., datasets with non-identical ranges, scales, offsets, etc.) against a single background image 230 while preserving the original format and values of each dataset.

In the illustrated aspect, the UI 320 enables the use of custom background images 230 via import button 460. According to an aspect, import button 460 opens a dialog box from which a file (e.g., a GIF, JPEG, TIFF, bitmap, PDF, or other file operable to provide an image) is selected to be imported as the background image 230. In other aspects, a background image 230 can also be imported by dragging a file into the plot area 210 from a different window in an operating system, via a button on a ribbon interface 340, etc. According to aspects, once the file is imported, it is associated with a coordinate system (e.g., that of the plot area 210, matching the positional values of a data series 220, or assigned an arbitrary coordinate system) for use as the background image 230.

According to aspects, an auto fit button 470 is provided to signal a system providing the map type visualization to attempt to best fit a dataset to the background image 230. In some aspects, the auto fit button 470 opens a dialog box to request additional preferences, borders/margins, or user input to identify key features of a custom image. According to aspects, when auto-fitting the dataset to the background image 230, the system is operable to plot the maximum and minimum positional values of the dataset to the edges of the background image 230, as is discussed in relation to FIG. 2A.

According to aspects, UI 320 includes save button 480, to store and apply the inputs made to the map type visualization via UI 320, and cancel button 490, to discard the changes made to the map type visualization via UI 320 since the last time the inputs were stored (e.g., via the save button 480). Other buttons, such as, for example, an "apply" button, a "save as" button, or a "done" button (not illustrated), are possible within the UI 320 and the map type visualization.

FIG. 5 illustrates an example UI 330 for visually modifying the presentation of a map type visualization. According to aspects, UI 330 is provided within the viewing pane 310 of a client application 300 providing the visualization, in a separate dialog box, or as part of a larger UI (e.g., a ribbon interface 340). According to aspects, UI 330 may be used in conjunction with other UIs (e.g., UI 320), mouse and keyboard controls (e.g., a mouse scroll wheel to zoom, keyboard arrow keys to pan, drag and drop to move a selected dataset, etc.), or separately. According to aspects, different elements within the visualization may be affected separately by the UI 330 or all the elements (e.g., a data series 220, a background image 230, etc.) may be affected at the same time.

According to aspects, UI 330 enables a user to manipulate the presentation of datasets within a map type visualization. Several pairs of opposing buttons are illustrated in FIG. 5, which are operable to provide opposing actions to the visualization and elements thereof. For example, button 510*a* may tilt a visualization backwards and button 510*b* tilt it forward, button 520*a* may rotate a visualization clockwise and button 520*b* rotate it counter-clockwise, button 530*a* may zoom into the visualization and button 530*b* zoom out of the visualization, etc. According to aspects, the opposing actions of the buttons are context dependent, such that, for example, when a user has selected the entire visualization, different actions are mapped to the buttons than when a user has selected a dataset. For example, when a dataset is selected, button pair 510 may be operable to affect an offset in the y dimension for the dataset, but when a background image 230 is selected, button pair 510 may be operable to tilt the visualization, as illustrated in the transition from FIG. 2C to FIG. 2D.

Figure 6:
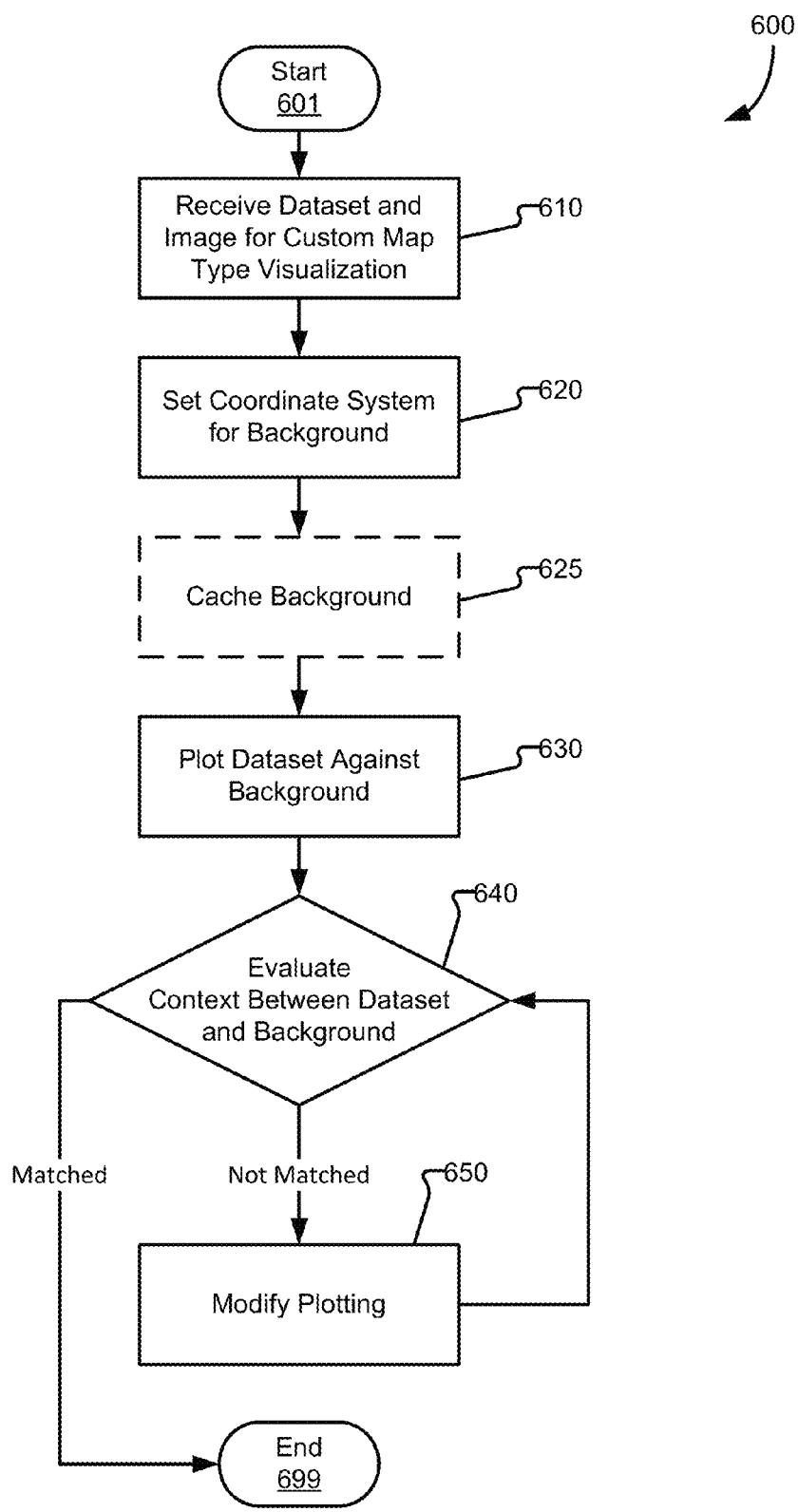
FIG. 6 illustrates a flow chart showing general stages involved in an example method for enabling custom map configuration.

FIG. 6 illustrates a flow chart showing general stages involved in an example method 600 for enabling custom map configuration.

Method 600 beings at START 601 and proceeds to OPERATION 610, where datasets and custom images are received for use in a map type visualization with a custom background. According to aspects, the datasets are configured according to a received visualization type for the map type visualization (e.g., heatmap, column, scatter plot/reference points, etc.) and include positional values for each data series 220 comprising the datasets. In various examples, the custom image may be any type of file operable to provide an image for use as a background in the map type visualization.

Method 600 proceeds to OPERATION 620, where a coordinate system is set for the background. According to aspects, a new coordinate system is created and applied to the custom image. According to aspects, the coordinate system created and applied to the custom image matches that of at least one received dataset. For example, a Cartesian coordinate system is created to match a dataset with Cartesian positional values. In other aspects, where the custom image replaces a pre-existing background, the coordinate system of the pre-existing background is retained and applied to the custom image. In examples that include replacing a pre-existing background, the custom image may leave portions of the plot area 210 of the pre-existing background blank (e.g., portions remain uncovered by the custom image) or the plot area 210 may be expanded by the custom image.

Method 600 optionally proceeds to OPERATION 625, where the background is optionally cached. According to aspects, the custom image and applied coordinate system are cached to enable repeated actions, such as, for example, applying animations, providing interactivity between the visualization and the represented dataset, allowing navigation of the visualization, and use of the background in other visualization or scenes. According to aspects, the file from which the custom image is provided is preserved; the custom image may be cached as a private object that retains the coordinate system applied to the custom image.

At OPERATION 630, method 600 plots the dataset against the background, wherein the positional values of the dataset are used to position the data series 220 within to coordinate system of the background. According to various examples, the data series including the maximum and minimum positional values are plotted at the edges of the background, such that the coordinate space of the background is a smallest coordinate space operable to contain the dataset.

Method 600 proceeds to DECISION OPERATION 640, where it is determined whether the dataset is plotted against the background according to the proper context from the dataset, for example, whether a data series 220 is plotted over the correct coordinates of the background. For example, a data series 220 corresponding to a restaurant is plotted according to proper context over the graphical representation of that restaurant on the custom image used as a background. When the dataset matches the background according to the context, method 600 proceeds to END 699, otherwise, method 600 proceeds to OPERATION 650 where the adjustments are made to how the dataset is plotted against the background.

The proper context for a plotting can be determined via various methods. In one example, key features are identified in the custom image via an image analysis which may parse text, detect borders of potential objects/regions, detect changes in color, and compare the custom image against images having known key features. In another example, a user may draw a box over an area of the background to tag the area defined by the box as a key feature. One or more key features from the custom image are then designated for use in determining proper context when plotting, such that the graphical representations of the data series 220 align with coordinates in the background according to the key features. In some examples, the data series 220 must align with all locations specified by the key features to be considered matching the context, but in other examples, the context is considered to be matched when a threshold number (e.g., after 3 aligned, after a majority aligned, etc.) of data series 220 align with locations specified by key features.

According to aspects, the key features are operable to specify alternative locations than the graphical representation of the key feature itself for a graphical representation of a data series 220 to align to, for example, when several graphical representations overlap in the map type visualization (such as in a data-dense area), one or more graphical representations may be move to an alternative location to prevent data series 220 from being obscured. In various examples when an alternative location is used, a callout (e.g., a line or curve from the key feature to the graphical representation of a data series 220) is used to indicated to a user that that an alternative location relates to the key feature.

When it is determined at DECISION OPERATION 640 that the dataset is not plotted properly against the background according to the context, method 600 proceeds to OPERATION 650, where the plotting of the dataset against the background in modified. For example, when a user substitutes a custom image of an antique map for a modern map in a map type visualization, the data series 220 may initially remain plotted according to the key features of the modern map although the corresponding key features in the antique map are positioned differently. For example, the antique map may have a decorative border, a different size or scale than the modern map, or be arranged differently or include different key features.

In various examples, the plotting of the dataset is automatically modified when the context does not match. For example, image analysis of the position of key features in the custom image relative to corresponding key features in a known image (e.g., having known positions of key elements) may be used to determine changes in scale and offset for the key features, which are subsequently applied to the dataset. For example, when an image analysis indicates that a custom image is n % larger than a previous background and has a margin (e.g., a decorative border, additional terrain, blank area, etc.), the dataset has a scale corresponding to the size difference between the custom and pre-existing images and an offset corresponding to the size of the margin applied to its positional values. In various examples, the size difference may be determined by a change in distance between key features in a given dimension (e.g., from $n_0$ pixels to $n_1$ pixels horizontally), a change in size of the graphical representation key features, or a change in a number of pixels comprising the image. In various examples, the margin may be determined by comparing a change in distance or size between key features and change in distance between key features and the edge of the image. As will be understood, margins may be uniform in their application or uneven (e.g., an additional 30 pixels added horizontally and 20 pixels removed vertically, 10 pixels added to the top and 5 pixels added to the bottom, etc).

In other examples, a user may manually apply scales and offsets or move the dataset and background relative to one another, for example, as discussed in relation to FIGS. 3-5. A user may also trigger automatic modification of the plotting, for example, via auto fit button 470.

After modifying how the dataset is plotted against the background, method 600 returns of DECISION OPERATION 640, where the re-plotting of the dataset against the background is evaluated again.

When it is determined at DECISION OPERATION 640 that the dataset is plotted properly against the background according to the context, method 600 proceeds to END 699, where method 600 concludes.

While examples and aspect of the present disclosure have been described in the general context of program modules that execute in conjunction with an application program that runs on an operating system on a computer, those skilled in the art will recognize that the present disclosure may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 7:
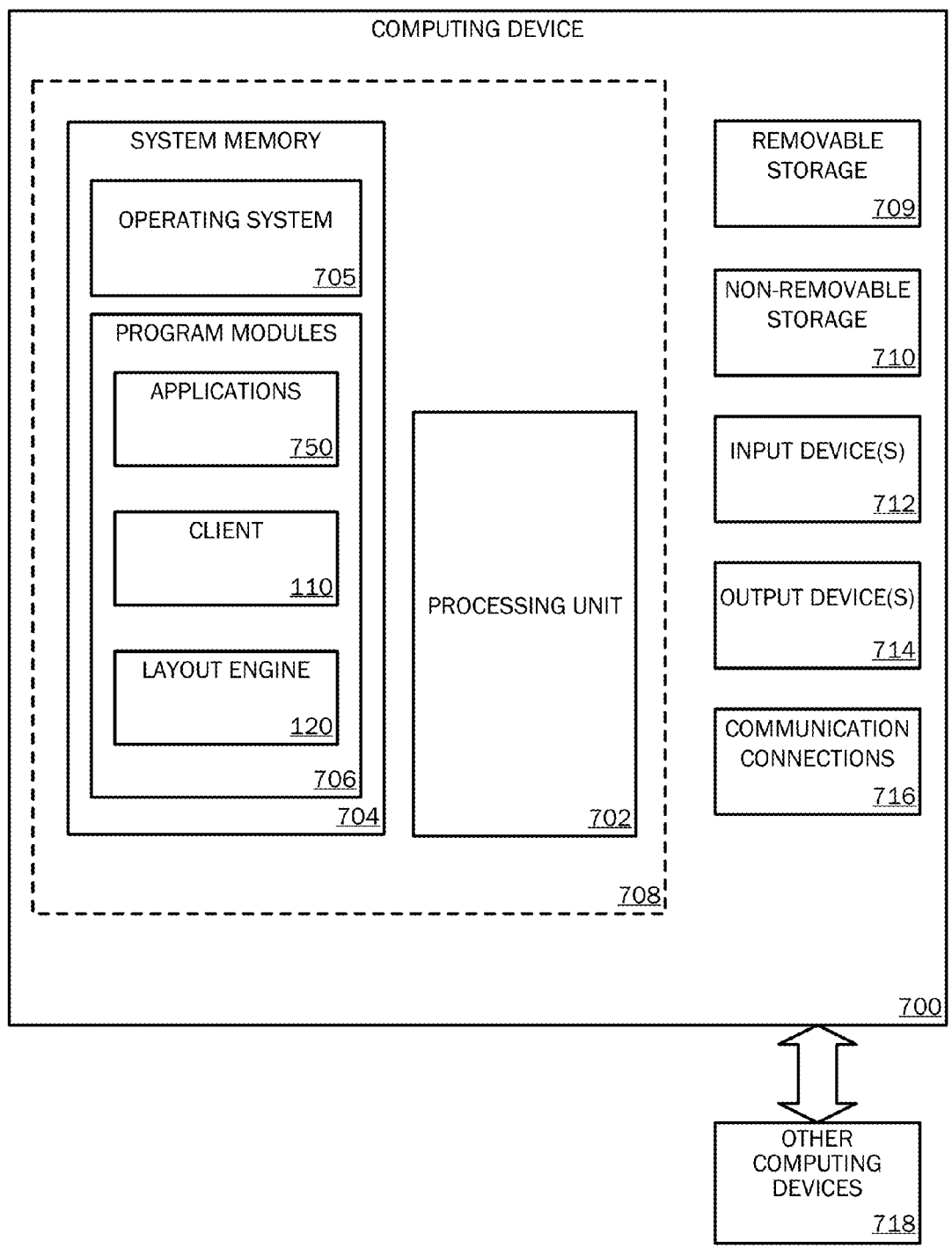
FIG. 7 is a block diagram illustrating physical components of a computing device with which examples may be practiced.
Figure 8A:
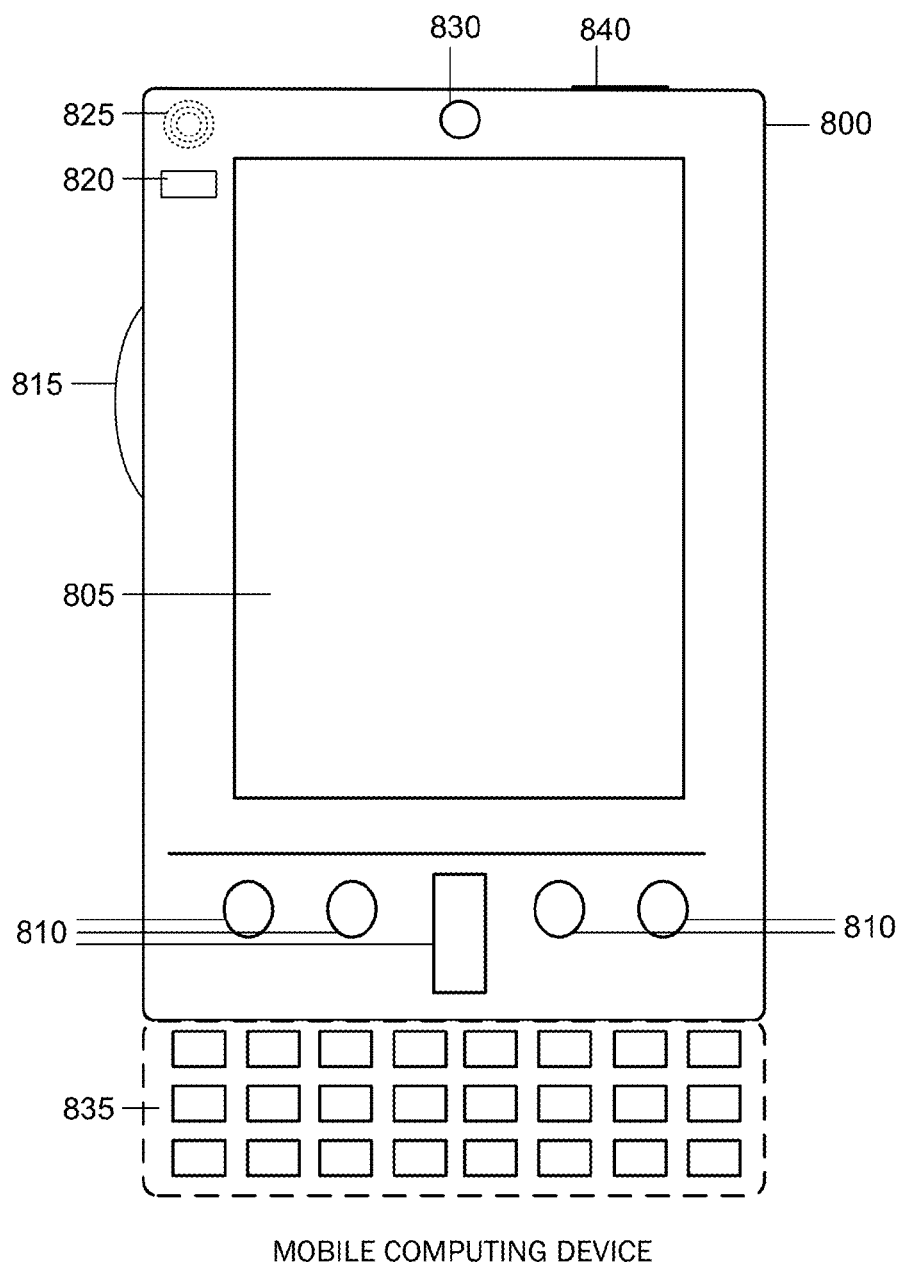
FIGS. 8A and 8B are block diagrams of a mobile computing device with which examples may be practiced.
Figure 8B:
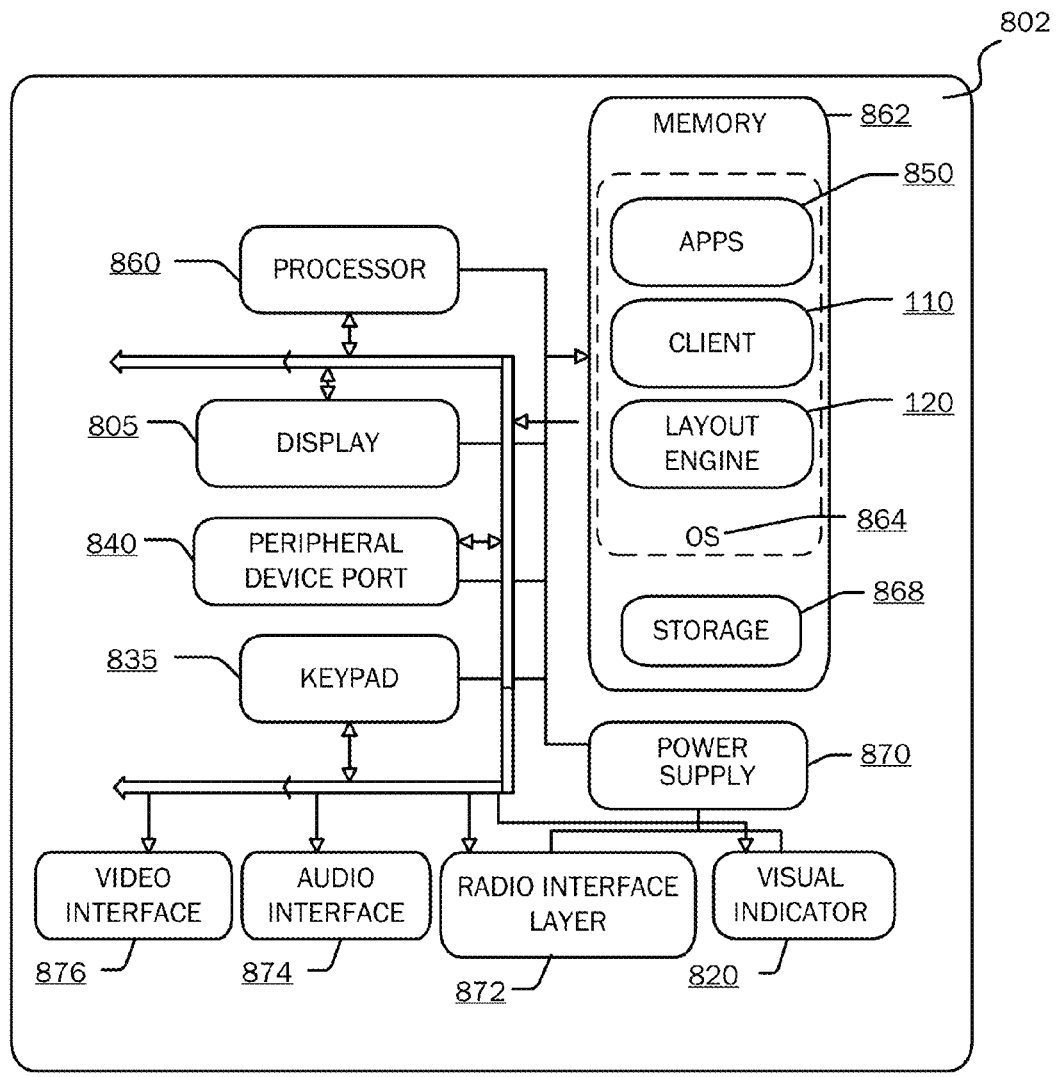
Figure 9:
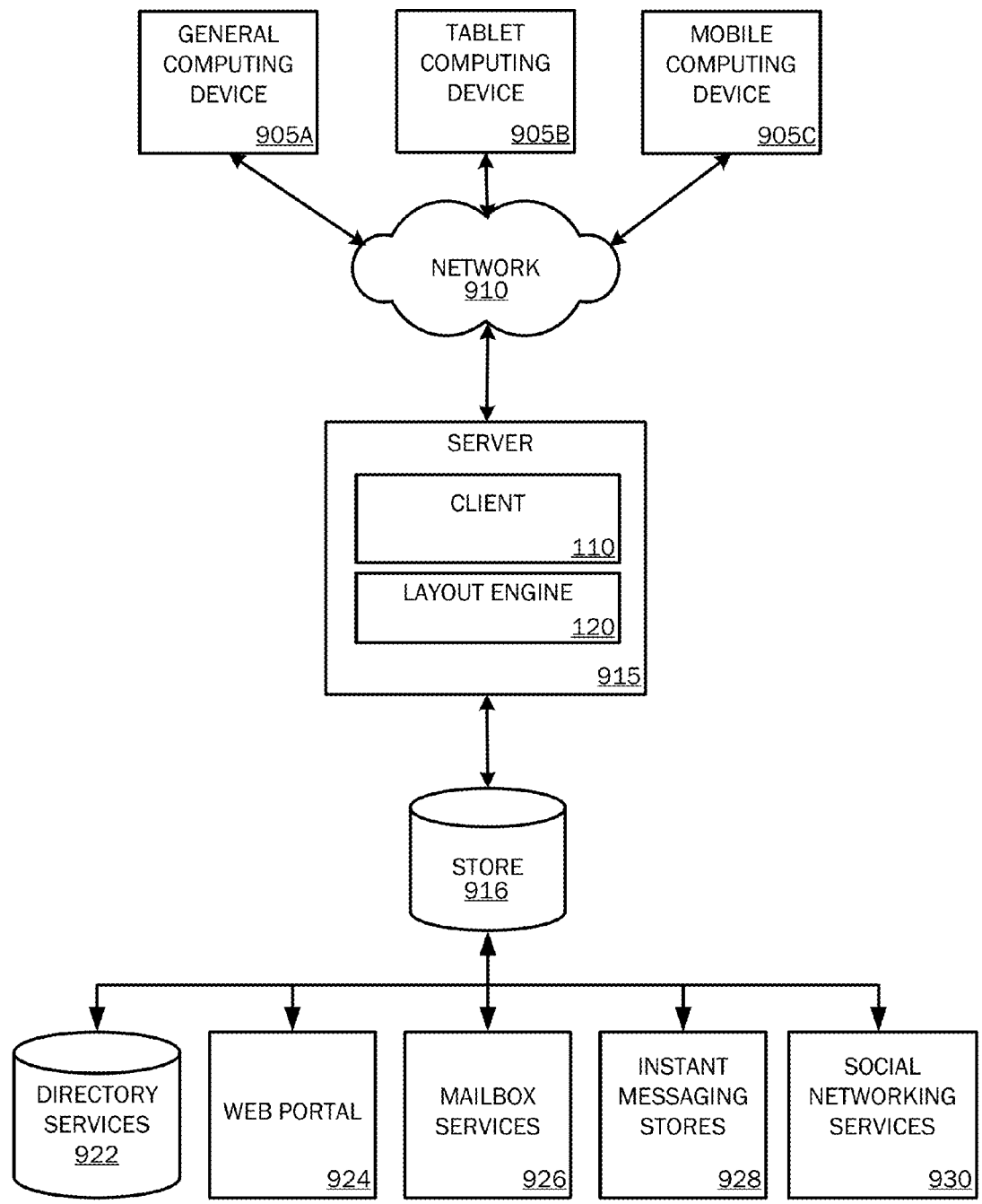
FIG. 9 is a block diagram of a distributed computing system in which examples may be practiced.

FIGS. 7-9 and the associated descriptions provide a discussion of a variety of operating environments in which examples may be practiced. However, the devices and systems illustrated and discussed with respect to FIGS. 7-9 are for purposes of example and illustration and are not limiting of a vast number of computing device configurations that may be utilized for practicing aspects of the disclosure, described herein.

FIG. 7 is a block diagram illustrating physical components (i.e., hardware) of a computing device 700 with which examples may be practiced. The computing device components described below may be suitable for the client device described above. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program modules 706 suitable for running software applications 750, such as client 110. According to an aspect, the system memory 704 may include the layout engine 120. The operating system 705, for example, may be suitable for controlling the operation of the computing device 700. Furthermore, aspects of the present disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and non-removable) such as, for example, magnetic disks, optical disks, or tape. Such additional storage is illustrated in FIG. 7 by a removable storage device 709 and a non-removable storage device 710.

As stated above, a number of program modules and data files may be stored in the system memory 704. While executing on the processing unit 702, the program modules 706 (e.g., client 110, layout engine 120) may perform processes including, but not limited to, one or more of the stages of the method 600 illustrated in FIG. 6. Other program modules that may be used in accordance with the present disclosure and may include applications such as electronic mail and contacts applications, word processing applications, spreadsheet applications, database applications, slide presentation applications, drawing or computer-aided application programs, etc.

Furthermore, examples may be practiced in an electrical circuit comprising discrete electronic elements, packaged or integrated electronic chips containing logic gates, a circuit utilizing a microprocessor, or on a single chip containing electronic elements or microprocessors. For example, examples may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, may be operated via application-specific logic integrated with other components of the computing device 700 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, aspects may be practiced within a general purpose computer or in any other circuits or systems.

The computing device 700 may also have one or more input device(s) 712 such as a keyboard, a mouse, a pen, a sound input device, a touch input device, etc. The output device(s) 714 such as a display, speakers, a printer, etc. may also be included. The aforementioned devices are examples and others may be used. The computing device 700 may include one or more communication connections 716 allowing communications with other computing devices 718. Examples of suitable communication connections 716 include, but are not limited to, RF transmitter, receiver, or transceiver circuitry; universal serial bus (USB), parallel, or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (i.e., memory storage.) Computer storage media may include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 8A and 8B illustrate a mobile computing device 800, for example, a mobile telephone, a smart phone, a tablet personal computer, a laptop computer, and the like, with which aspects may be practiced. With reference to FIG. 8A, an example of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative examples, mobile computing device 800 may incorporate more or less input elements. For example, the display 805 may not be a touch screen in some examples. In alternative examples, the mobile computing device 800 is a portable phone system, such as a cellular phone. The mobile computing device 800 may also include an optional keypad 835. Optional keypad 835 may be a physical keypad or a "soft" keypad generated on the touch screen display. In various aspects, the output elements include the display 805 for showing a graphical user interface (GUI), a visual indicator 820 (e.g., a light emitting diode), or an audio transducer 825 (e.g., a speaker). In some examples, the mobile computing device 800 incorporates a vibration transducer for providing the user with tactile feedback. In yet another example, the mobile computing device 800 incorporates peripheral device ports 840, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one example of a mobile computing device. That is, the mobile computing device 800 can incorporate a system (i.e., an architecture) 802 to implement some examples. In one example, the system 802 is implemented as a "smart phone" capable of running one or more applications (e.g., browser, e-mail, calendaring, contact managers, messaging clients, games, and media clients/players). In some examples, the system 802 is integrated as a computing device, such as an integrated personal digital assistant (PDA) and wireless phone.

One or more application programs 850, for example, client 110, may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. According to an aspect, the layout engine 120 may be loaded into memory 862. The system 802 also includes a non-volatile storage area 868 within the memory 862. The non-volatile storage area 868 may be used to store persistent information that should not be lost if the system 802 is powered down. The application programs 850 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800.

The system 802 has a power supply 870, which may be implemented as one or more batteries. The power supply 870 might further include an external power source, such as an AC adapter or a powered docking cradle that supplements or recharges the batteries.

The system 802 may also include a radio 872 that performs the function of transmitting and receiving radio frequency communications. The radio 872 facilitates wireless connectivity between the system 802 and the "outside world," via a communications carrier or service provider. Transmissions to and from the radio 872 are conducted under control of the operating system 864. In other words, communications received by the radio 872 may be disseminated to the application programs 850 via the operating system 864, and vice versa.

The visual indicator 820 may be used to provide visual notifications or an audio interface 874 may be used for producing audible notifications via the audio transducer 825. In the illustrated example, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio 872 or via a distributed computing network. Similarly, such data/information may be readily transferred between computing devices for storage and use according to well-known data/information transfer and storage means, including electronic mail and collaborative data/information sharing systems.

FIG. 9 illustrates one example of the architecture of a system for providing data visualization as described above. Content developed, interacted with, or edited in association with the client 110 or layout engine 120 may be stored in different communication channels or other storage types. For example, various documents may be stored using a directory service 922, a web portal 924, a mailbox service 926, an instant messaging store 928, or a social networking site 930. The client 110 or layout engine 120 may use any of these types of systems or the like for providing data visualization, as described herein. A server 915 may provide the client 110 or layout engine 120 to clients 905A-C. As one example, the server 915 may be a web server providing the client 110 or layout engine 120 over the web. The server 915 may provide the client 110 or layout engine 120 over the web to clients 905 through a network 910. By way of example, the client computing device may be implemented and embodied in a personal computer 905A, a tablet computing device 905B or a mobile computing device 905C (e.g., a smart phone), or other computing device. Any of these examples of the client computing device may obtain content from the store 916.

Aspects of the present disclosure are described above with reference to block diagrams or operational illustrations of methods, systems, and computer program products. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope of the present disclosure in any way. The aspects, examples, and details provided in this application are considered sufficient to convey possession and enable others to make and use the best mode of present disclosure. The present disclosure should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope of the present disclosure.

We claim:

1. A method for providing custom backgrounds in map type visualizations, comprising:
    receiving a custom image specified for use by a user as a background image for a map type visualization;
    receiving a dataset, including positional values, to plot in the map type visualization against the background image;
    applying a coordinate system to the custom image to create the background image;
    plotting the dataset against the background image within the coordinate system according to the positional values, wherein minimum and maximum positional values are plotted at edges of the background image such that a coordinate space of the background image is a smallest coordinate space operable to contain the dataset;
    determining whether the dataset is plotted properly against correct coordinates of the background image according to a context; and
    when the dataset is determined to not be plotted properly against the background image according to the context, modifying how the dataset is plotted against the correct coordinates of the background image.

2. The method of claim 1, wherein the dataset is plotted against the background image based on a maximum value and a minimum value of the positional values, wherein a data series of the dataset including the maximum value or the minimum value is plotted to an edge of the background image.

3. The method of claim 1, wherein the context is determined according to an analysis of the custom image identifying key features in the custom image.

4. The method of claim 1, wherein modifying how the dataset is plotted includes at least one of:
    applying an offset to the positional values of the dataset;
    applying a scale to the positional values of the dataset; and
    repositioning an origin of the coordinate space.

5. The method of claim 1, further comprising caching the background image, wherein the cached background image retains the applied coordinate system and is operable to be used in a different visualization.

6. The method of claim 1, wherein the custom image is an image tile, wherein the image tile is associated with a set of image tiles operable to provide a plurality of views of the background image.

7. The method of claim 1, wherein modifying how the dataset is plotted further comprises:
    disassociating the dataset from the background image;
    moving the dataset relative to the background image; and
    re-associating the dataset to the background image.

8. The method of claim 1, wherein the custom image replaces a pre-existing background image, wherein the coordinate system applied to the custom image is taken from the pre-existing background image.

9. A system for providing custom backgrounds in map type visualizations, comprising:
    a processor; and
    a memory storage including instructions, which when executed by the processor provide:
    a layout engine, operable to receive a dataset including positional values, a custom image specified for use by a user, and a visualization type to create a map type visualization of the dataset plotted against the custom image according to the visualization type, wherein the layout engine includes:
        a coordinate mapping module, operable to create and apply a coordinate system to the custom image; and
        an image analysis module, operable to determine key features in the custom image to determine a context according to which the dataset is plotted against in the map type visualization where minimum and maximum positional values are at edges of the custom image such that a coordinate space of the custom image is a smallest coordinate space operable to contain the dataset, and wherein the context is operable to signal the layout engine whether the dataset is plotted properly against the custom image; and
    wherein, the layout engine is further operable to modify how the dataset is plotted against correct coordinates of the custom image.

10. The system of claim 9, wherein the custom image replaces a pre-existing background image, wherein the image analysis module is further operable to determine corresponding key features in the pre-existing background image and associated the key features in the custom image with the corresponding key features in the pre-existing background image.

11. The system of claim 10, wherein the layout engine is further operable to modify how the dataset is plotted against the custom image by applying at least one of:
    a scale, wherein the image analysis module is further operable to determine the scale based on a change in distance in a given dimension between the key features in the custom image and the corresponding key features in the pre-existing background image; and
    an offset, wherein the image analysis module is further operable to determine the offset based on a change in distance in a given dimension between the key features in the custom image and the corresponding key features in the pre-existing background image and a change in size between the custom image and the pre-existing background image.

12. The system of claim 9, wherein the map type visualization is created in a three-dimensional space, wherein the custom image is a surface in the three-dimensional space.

13. The system of claim 9, wherein a given dimension of the coordinate system is based on maximum positional value and a minimum positional value of the dataset in the given dimension.

14. The system of claim 9, wherein the coordinate mapping module is further operable to calculate a pixel-scale for the positional values of the dataset relative to pixel dimensions of the custom image.

15. The system of claim 9, wherein the layout engine is further operable to cache the custom image, wherein the cached custom image retains the applied coordinate system and is operable to be used in a different visualization.

16. The system of claim 9, wherein the custom image is part of a set of image tiles, wherein the set of image tiles provides a plurality of views in the map type visualization based on a zoom level and a viewing angle.

17. A computing device for providing custom backgrounds in map type visualizations, comprising:
a processor; and
a memory storage including instructions, which when executed by the processor cause the computing device to be operable to:
receive a custom image specified for use by a user as a background image for a map type visualization, the custom imaging having a pixel-size;
receive a dataset, including positional values, to plot in the map type visualization against the background image;
apply a coordinate system to the custom image to create the background image, wherein the coordinate system includes an origin and a pixel-scale relating the positional values of the dataset to the pixel-size of the custom image;
plot the dataset against the background image within the coordinate system according to the positional values and pixel-scale wherein minimum and maximum positional values are at edges of the background image such that a coordinate space of the background image is a smallest coordinate space operable to contain the dataset;
determine whether the dataset is plotted properly against the background image according to a context, wherein the context is determined according to an analysis of the custom image identifying key features in the custom image; and
when the dataset is determined to not be plotted properly against the background image according to the context, apply to the positional values of the data set to modify how the dataset is plotted against correct coordinates of the background image at least one of:
a scale, wherein the scale affects the positional values relative to a distance from the origin; and
an offset, wherein the offset affects the positional values irrespective of a distance from the origin.

18. The computing device of claim 17, wherein a user interface is provided to enable a user to modify how the dataset is plotted against the background image, wherein the user interface enables:
unlocking the dataset from the background image;
moving the unlocked dataset, wherein the unlocked dataset is moved independently from the background image, thereby moving relative to the background image;
locking the dataset to the background image; and
moving the locked dataset, wherein the locked dataset and background image are equally moved to provide a different view of the map type visualization.

19. The computing device of claim 17, further operable to cache the background image, wherein the cached background image retains the applied coordinate system and is operable to be used in a different visualization.

20. The computing device of claim 17, wherein the custom image is an image tile, wherein the image tile is associated with a set of image tiles operable to provide a plurality of views of the background image according to a zoom level and a viewing angle.

* * * * *